United States Patent [19]

Lee et al.

[11] Patent Number: 5,548,368
[45] Date of Patent: Aug. 20, 1996

[54] FILM CASSETE SPOOL WITH EXPOSURE INDICATOR

[75] Inventors: Bernard W. N. Lee, 1702 Laurelwood Place, Gloucester, Ontario, Canada, K1C 6Y8; John Tutton, North Gower, Canada

[73] Assignee: Bernard W. N. Lee, Gloucester, Canada

[21] Appl. No.: 508,101

[22] Filed: Jul. 27, 1995

[30] Foreign Application Priority Data

Nov. 8, 1994 [CA] Canada ................................... 2135324

[51] Int. Cl.⁶ ........................................... G03B 17/26
[52] U.S. Cl. ................................... 354/275; 354/105
[58] Field of Search ............................................ 354/275

[56] References Cited

U.S. PATENT DOCUMENTS

| | | | |
|---|---|---|---|
| 4,338,015 | 7/1982 | Holmes | 354/275 |
| 4,887,110 | 12/1989 | Harvey | 354/275 |
| 4,894,673 | 1/1990 | Beach | 354/275 |
| 4,947,197 | 8/1990 | Smart et al. | 354/214 |
| 4,965,600 | 10/1990 | Smart et al. | 354/212 |
| 4,978,985 | 12/1990 | Smart et al. | 354/275 |
| 4,994,833 | 2/1991 | Cocca | 354/207 |
| 4,998,123 | 3/1991 | Smart | 354/275 |
| 5,003,334 | 3/1991 | Pagano et al. | 354/275 |
| 5,032,862 | 7/1991 | Behnke | 354/275 |
| 5,079,579 | 1/1992 | Pagano et al. | 354/288 |
| 5,115,268 | 5/1992 | Kitagawa et al. | 354/275 |
| 5,153,627 | 10/1992 | Dwyer | 354/217 |
| 5,264,886 | 11/1993 | Byrd | 354/275 |
| 5,278,600 | 1/1994 | Takahashi et al. | 354/275 |
| 5,463,435 | 10/1995 | Ezawa | 354/21 |
| 5,495,310 | 2/1996 | Takatori | 354/288 |

Primary Examiner—Michael L. Gellner
Assistant Examiner—John Chizmar
Attorney, Agent, or Firm—Jones, Tullar & Cooper, P.C.

[57] ABSTRACT

A film spool of the type which is rotatable inside a light-tight cassette shell as a film strip coiled about the spool is pulled out of the shell, has a film exposure status indicator movable from a first position to a second position where it provides a visible indication that the film is completely exposed. The status indicator includes an element movable within the hollow interior of the spool core between the first and second positions, a spring urging the element towards the second position, and a retaining device cooperating with an end portion of the film strip to prevent movement of the element until the film strip has been fully unwound.

13 Claims, 5 Drawing Sheets

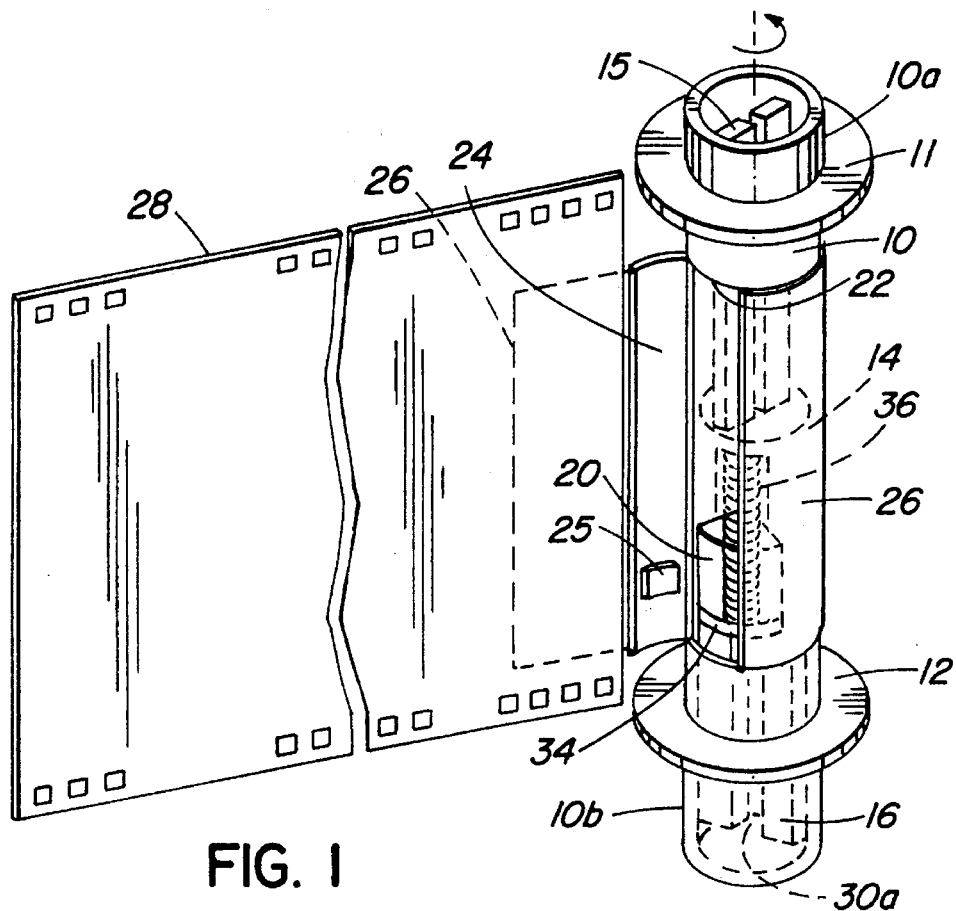
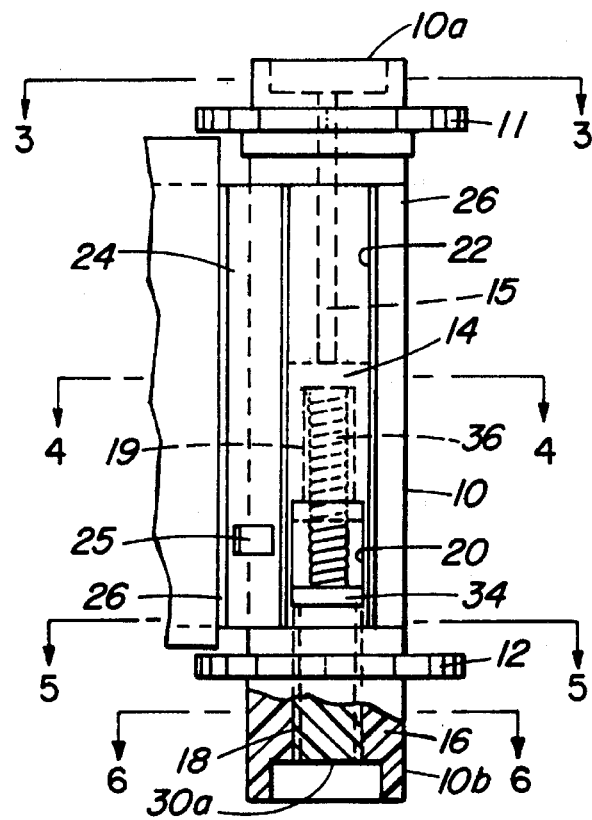
FIG. 1
FIG. 2

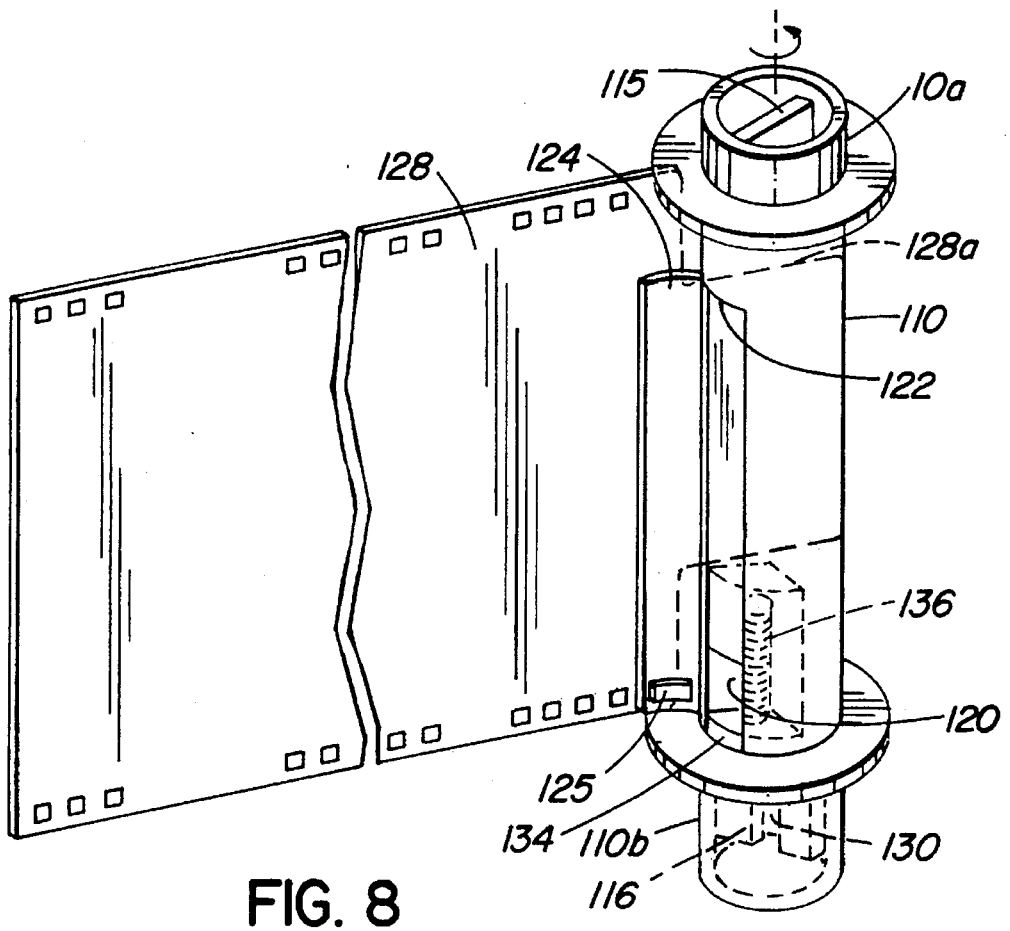
FIG. 8
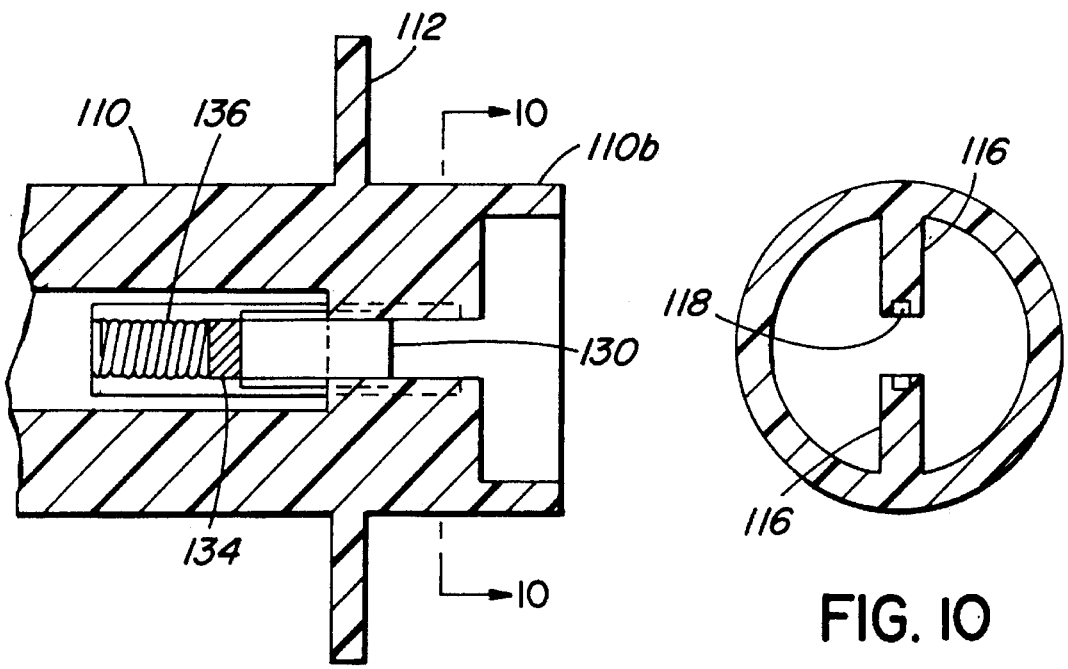
FIG. 9
FIG. 10

FILM CASSETE SPOOL WITH EXPOSURE INDICATOR

BACKGROUND OF THE INVENTION

1. Field of the Invention.

The invention relates to the field of photography and in particular to a film spool for use in a film cassette and having indicator means for informing the photographer that a film strip inside the cassette has been fully exposed.

2. Description of the Prior Art

In conventional 35 mm film cassettes such as manufactured by Eastman Kodak Co. or Fuji Photo Film Co., Ltd.,(hereinafter referred to respectively as "Kodak" and "Fuji") the film strip is wound on a flanged spool which is rotatably supported within a cylindrical shell. A leading portion of the film strip, termed the "film leader", normally protrudes from a light-trapped slit or mouth of the cassette shell. The spool has a first (normally upper) recessed end engageable by rewinding means, and has a second (normally lower) end with a projection rotatable in a recess in the camera. After insertion of the cassette, the film leader is pulled out and attached to the take-up spool, and is wound on the latter spool by winding means as frames of the film are exposed. When all the film has been exposed, the take-up spool is released from the winding means and the rewinding means is used to rewind the film into the cassette.

Normally, it is assumed that a film cassette with a projecting film leader is unexposed, and that when the leader is fully wound into the cassette the film has been exposed. However, this assumption is not correct in the following situations:

1) An exposed film strip is not fully wound into the cassette. Such a film strip may inadvertently be re-used, causing double exposure, meaning that the photographer loses two sets of photographs.

2) A film strip may be rewound by accident, when it is unexposed, or only partially exposed. This can easily occur with automatic cameras, if the wrong button is pressed. It is possible retrieve a film strip from a cassette using a tool, but if this is not done immediately the unexposed film may inadvertently be sent for processing.

3) Due to improper loading, a film strip may not be engaged by a wind-up spool, and the unexposed film may be removed from the camera and sent for processing when the photographer has taken the expected number of frames, as indicated by a counting device on the camera.

While some prior art patents address the double exposure problem, none provides a simple spool, for use in a standard camera and using standard film, which automatically indicates whether or not the film strip it carries has been fully exposed.

U.S. Pat. No. 4,338,015, which issued Jul. 6, 1982, to Polaroid Corp., suggests a spool which has a threaded shaft and nut arrangement together with an exposure-indicating pin mounted within one end of the spool. When the film strip is fully exposed the pin is moved by the nut to a visible location to indicate complete exposure. However, this is fairly complex mechanically, and has the drawback that it requires different spools for different lengths of film. Also, to allow the film strip to unwind freely during processing after the film strip is re-wound in the film cassette it seems that special tools would be required.

U.S. Pat. No. 5,032,862, which issued Jul. 16, 1991 to Behnke, and U.S. Pat. No. 5,264,886, which issued Nov. 23, 1993 to Byrd, show simple devices which indicate whether or not a cassette has been put into a camera. However, these do not indicate whether the film strip has been fully exposed.

A series of patents has issued to Kodak describing a type of cassette which, unlike conventional cassettes, can be operated to automatically advance a film leader out of the cassette shell by rotating the film spool in the unwinding direction. In this case the basic cassette itself provides no indication of whether the film has been exposed. The Kodak patents describe various exposure indicators which may be used with these cassettes to provide a warning that the film was exposed. In some cases a manually movable indicator is used. In others the film strip has notches which allow it to move transversely of the film exit slot after it has been fully exposed. In others, a special camera mechanism is capable of moving an indicator on the cassette when full exposure has occurred. Representative Kodak patents showing these arrangements are as follows:

U.S. Pat. No. 4,887,110, issued Dec. 12, 1989;
U.S. Pat. No. 4,894,673, issued Jan. 16, 1990;
U.S. Pat. No. 4,947,197, issued Aug. 7, 1990;
U.S. Pat. No. 4,965,600, issued Oct. 3, 1990;
U.S. Pat. No. 4,978,985, issued Dec. 18, 1990;
U.S. Pat. No. 4,994,833, issued Feb. 19, 1991;
U.S. Pat. No. 4,998,123, issued Mar. 5, 1991;
U.S. Pat. No. 5,003,334, issued Mar. 26, 1991.

All of these cassettes appear to be designed for special automatic cameras which have winding means to advance the film out of the spool, and are not designed to be hand-loaded. Also, the film is different from the conventional 35 mm. film, in that the leader end has a full width, and so cannot be used on the more conventional types of cameras.

Fuji has U.S. Pat. Nos. 5,115,268, issued May 19,1992, and 5,278,600, issued Jan. 11, 1994, directed to special spools, which again are of the type in which the film is advanced out of the spool by the unwinding mechanism. Again they seem to require special cameras.

SUMMARY OF THE INVENTION

In accordance with the present invention, a film spool of the type which is rotatable inside a cassette shell and has means attachable to one end portion of a length of photographic film to be wound thereon, has film exposure indicator means for providing visible indication that the film has been fully exposed. The spool has a core with an interior which is at least partially hollow, and the indicator means comprises an element having an indicator part and which is movable within the core from a first position to a second position, in which latter position this indicator part gives a visual indication of exposure. The indicator means further comprises spring means urging the element towards the second position, and retaining means cooperating with an end portion of a film held by the attachable means to prevent movement of the element to the second position when any film remains wound on the spool. The retaining means is movable outwardly from the hollow interior of the core when the film is wholly unwound from the spool to release the element and to allow the element to be moved by the spring means to its second position.

Preferably the spool is of the type having a first recessed end and a second projecting end, the first end being engageable by winding means, and the element is movable axially within the spool core, so that, in its second position, an end of the element which provides said indicating part is visible at the projecting end of the core.

The retaining means for the end portion may include a part hinged to the core so as to be hingedly moved away from the core when the film is fully unwound.

In a preferred embodiment, the spring means is molded integrally with the movable element as a single piece. This may have a hollow cavity terminating in an end wall and in part surrounded by side wall means, the outer surface of the end wall forming the indicator part of the element. The spring means may comprise an elongated resilient member extending from the end wall within the cavity. The resilient member has a relaxed relatively straight condition extending from the end wall to beyond the ends of the side wall means, and has a compressed condition in which it is bowed between the end wall and a partition in the spool core when the element is in its first position.

This embodiment of spool may be formed entirely of three plastic molded parts, namely the spool core with the hollow interior, the movable element with integral spring means, and retaining means in the form of a door part which is fitted into an aperture in the spool body and having an internal lug or detent engageable with latching means on the side wall means of the movable element.

BRIEF DESCRIPTION OF THE DRAWINGS

The invention will be further described with reference to the accompanying drawings, in which:

FIG. 1 is a perspective view of a spool in accordance with the invention, with part of a film strip fully unwound from the spool;

FIG. 2 is a side view of the same items, partially sectioned;

FIG. 8 is a view similar to FIG. 1 of a second embodiment;

FIGS. 9 and 10 are detailed longitudinal and cross-sectional views of the second embodiment;

DESCRIPTION OF THE PREFERRED EMBODIMENT

Figure 3:
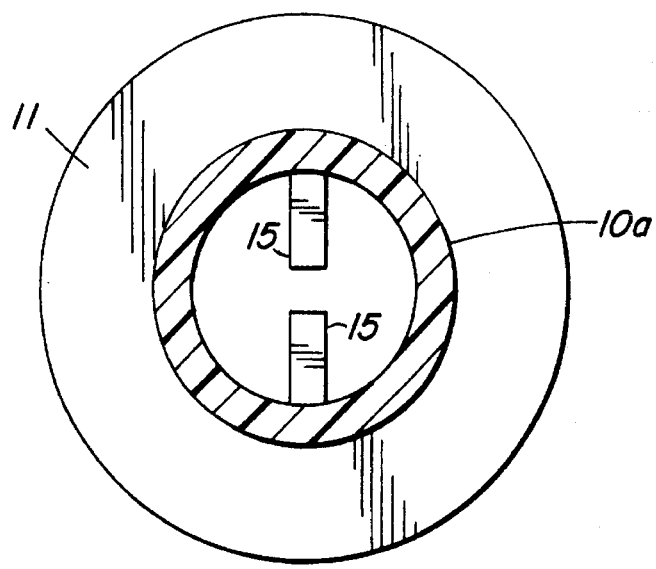
FIGS. 3, 4, 5 and 6 are sectional views on section lines 3—3, 4—4, 5—5, and 6—6, respectively, of FIG. 2, showing the shape of the core parts without the film strip and parts connected thereto.
Figure 4:
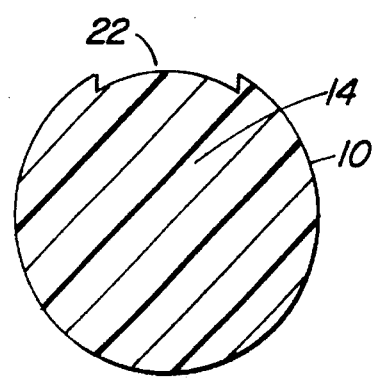

FIGS. 1 and 2 show a spool similar to the type made of molded plastics material having a generally cylindrical core 10 and upper and lower integrally molded flanges 11 and 12. The core has a first, upper, end 10a which projects slightly above the flange 11, this end being recessed to receive a rewinding spindle, and has a second, lower end 10b which projects substantially below flange 12 and which fits rotatably into a circular recess in a camera. The spool is normally contained inside a light-tight cassette shell (not shown) with both projections 10a and 10b fitting closely within circular apertures at the ends of the shell.

An upper portion of the core has a hollow generally cylindrical interior, this interior terminating in a solid partition 14. It also includes two opposite inwardly projecting parallel ribs 15 having a narrow space in between and designed to be engaged by the rewinding spindle. Two similar but shallower parallel ribs 16 are provided in the lower projecting part 10b of the core; in some kinds of camera it is these lower ribs which engage the camera winding means.

Figure 5:
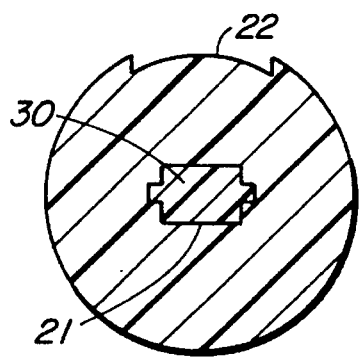
Figure 6:
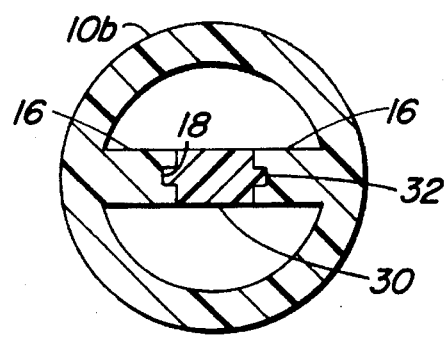

The indicator means of this invention fits within the lower portion of the interior of the spool, below the partition 14. To receive the indicator means, the spool is modified by having longitudinal grooves 18 formed in the inwardly facing surfaces of the ribs 16. In addition, a rectangular recess 20 is formed in the sidewall of the lower part of the core, above the flange 12. A cylindrical bore 19 extends upwardly from the top of this recess. Below this recess is a portion of the core which is solid except for a generally rectangular shaped guideway 21, having grooved sides, as shown in the centre of FIG. 5, and which provides a transition between the recess and the grooved ribs as shown in FIG. 6.

A shallow recess 22 is provided in the outer surface of the core extending most of the length of the core between the two flanges, and occupying one-quarter or less of the periphery. Fitting normally within this recess is a thin curved door part 24 hinged at one side of the recess so that its outer surface provides a continuation of the cylindrical surface of the core. On the inner side of this door part is a lug 25 which provides a retaining means for the indicator described below.

The hinge connection for the door is provided by part of a piece of adhesive tape 26 which has an outer end part attached to an end portion 28 of the film strip and has an inner end part secured to the surface of the core outside the area of recess 22, being partly wrapped around the core.

Figure 7C:
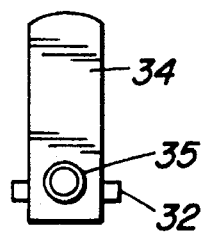
FIGS. 7a, 7b, and 7c are views an element having an indicating part.
Figure 7A:
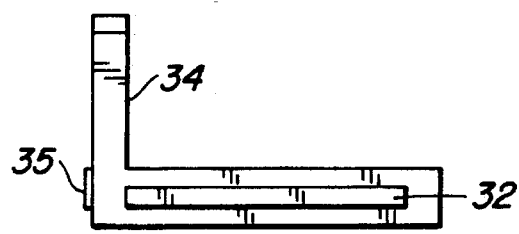
Figure 7B:
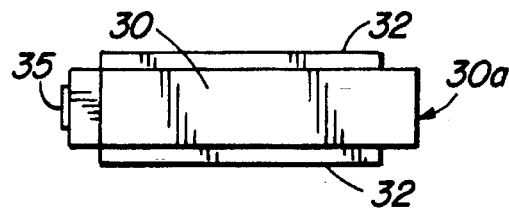

The indicator itself is provided by the lower end part 30a of an axially slidable element 30 which is shown in detail in FIGS. 7a, 7b and 7c. The element has a mainly rectangular body with side ribs 32 which fit slidably within the grooves 18 of ribs 16 and in the similar grooves of guideway 21. It is arranged so that in its lowest position the lower end part 30a, which is then aligned with or below the lower ends of ribs 16, is readily visible at the lower end of the spool and provides an indication that the film has been exposed. A side arm 34 extends from the upper end of the element out of the rectangular recess 20 and is capable of being engaged by the lug 25 when near the upper end of recess 20. The upper end of the element has a small boss 35 engageable with a compression spring 36 received in the bore 19. The element 30 is inserted laterally into the recess 20 while the spring 36 is held compressed, and then allowed to move down slightly to engage in the grooves of guideway 21 as shown in FIG. 5.

When the film is unexposed, the element 30 is in an upper position, with the spring 36 compressed and with the door 24 closed and lug 25 engaging the side arm 34 to retain the element in this position, in which its lower end is not effectively visible. The door 24 is held closed by the length of film wound around the core.

When the film is fully exposed, and all of the film strip has been pulled off the core, tension in the film strip pulls the door 24 open and releases the arm 34 from the lug 25. The element 30 is then moved downwards by the spring 36 until the arm 34 reaches the bottom of recess 20. At this stage the lower indicating part 30a is level with the ribs 18, and the apparently continuous rib provides a readily visible indication that the film has been exposed. The nature of the core as shown in FIG. 5 ensures that light cannot enter the cassette after it has been taken from the camera, even if the door 24 is not fully closed. While the element 30 is in this position it also prevents engagement of any winding means with ribs 16.

FIGS. 8, 9, and 10 show a modified form of the invention adapted to suit a spool of type in which a narrow end portion of the film leader passes through a slot in the spool core. The mechanism is similar to that described above, but is accommodated in a shorter length of the hollow interior of the core, below the central part which has the transverse slot which receives the end of the film strip 128. When the film strip is wound on the spool, this end of the film strip holds the door 124 closed. This door is located by small hinge pins (not shown), since here no adhesive tape is used, and is urged open by a small spring which is also not shown. Otherwise, this embodiment has similar parts of the indicating mechanism as the version just described, and these are indicated in the drawings by reference numerals which are the same as those for the first version, but increased by 100.

FIGS. 11 to 18 show a third embodiment of spool, similar to the second embodiment in that its structure is confined to the space below the slot configuration used with a film strip which passes through the center of the spool; however the same construction can of course be used for all types of spool. A particular feature of this embodiment is that the spring means and movable element are integrally molded as a single piece. This embodiment is in fact entirely constructed of three readily moldable parts, namely the spool body, the combined movable element and spring means, and a door part which provides the retaining means.

As in the earlier embodiments, the spool body has a core 210 with upper and lower flanges 211 and 212, and upper and lower ends 210a and 210b similar to the second embodiment, with the upper end having inwardly projecting ribs (not shown) for engagement by a rewinding spindle.

Figure 11:
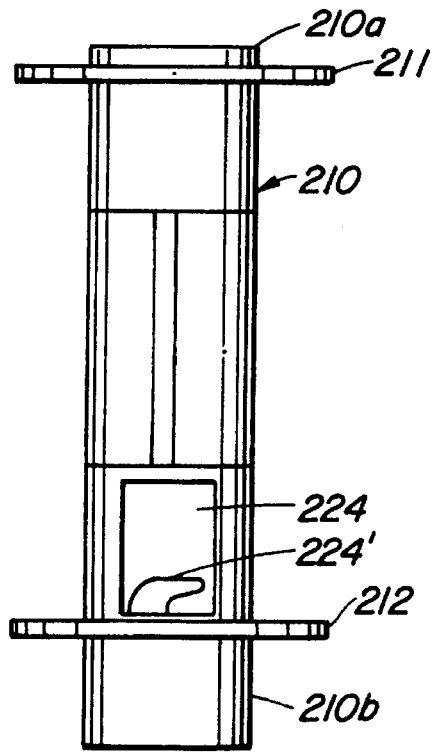
FIG. 11 is a side view of a third embodiment.
Figure 12:
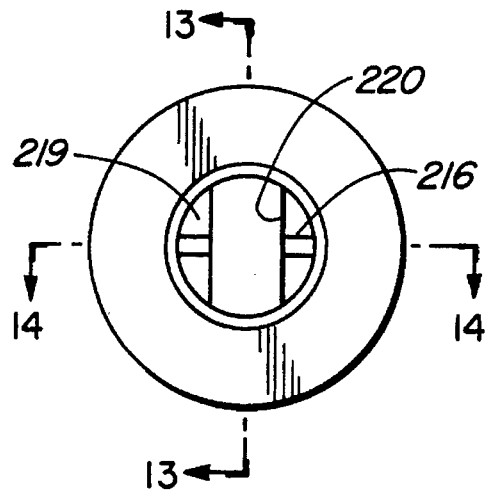
FIG. 12 is a bottom view of the third embodiment.

As before, the indicating means fits within the interior of a cylindrical lower portion of the spool body, below a partition 214. Here the spool has, firstly, a shallow circular recess 219 communicating with lower end 210b, and, within this, a deeper, recess 220 of rectangular cross section providing a hollow interior for the spool. At about half its depth, the recess 220 is provided with an inwardly projecting detent 221, providing a secondary retaining means for the movable element, as will be described. Two ribs 216, best seen in FIGS. 12 and 14, project downwardly from the bottom of the shallow recess 219 and inwardly from its sides; these ribs are engageable with winding means of certain cameras, for example Ricoh cameras. An aperture 222 is formed in the sidewall of the lower part of the core, above the flange 212, communicating with the recess 220 along a narrow side, and this accommodates a molded door part 224, shown separately in FIG. 17. The outer surface of this door part provides a continuation of the cylindrical surface of the lower end portion of the core, and extending from this outer surface is a film engaging hook element 224' having an end portion spaced from the cylindrical door surface and projecting in a circumferential direction, as seen in FIG. 11, and suitable for engagement in an aperture in a film strip adjacent the end portion which passes through the spool slot. The inner side of this door part carries a retaining lug or detent 225 which provides a retaining means for the movable element described below. The door part 224 is generally L-shaped, the main, curved leg portion 224a of this part being connected at a right angle to a shorter base leg portion 224b which projects inwardly relative to the core, level with the partition 214; this base leg portion has an inner end notch engaging with a complementary undercut formation in the partition. The door part is sufficiently flexible that when the film strip unwinds it pulls on the hook element 224' and this bends the main leg portion 224a outwardly, as shown in FIG. 15; this accordingly provides an operable connection between the film strip and retaining detent 225.

Figure 13:
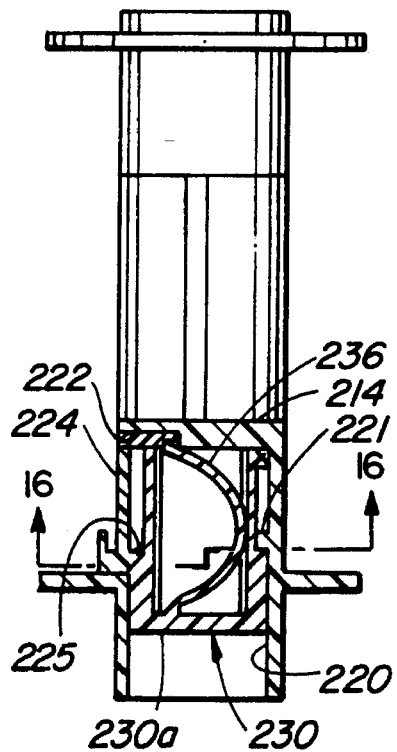
FIG. 13 is a longitudinal section of the third embodiment on lines 13—13 of FIG. 12.
Figure 14:
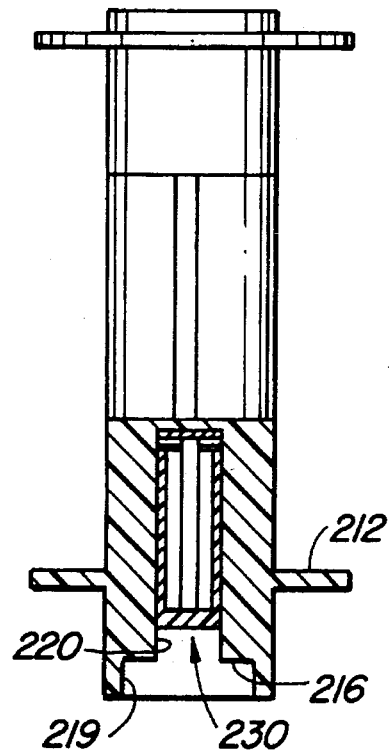
FIG. 14 is a longitudinal section of the third embodiment on lines 14—14 of FIG. 12.
Figure 16:
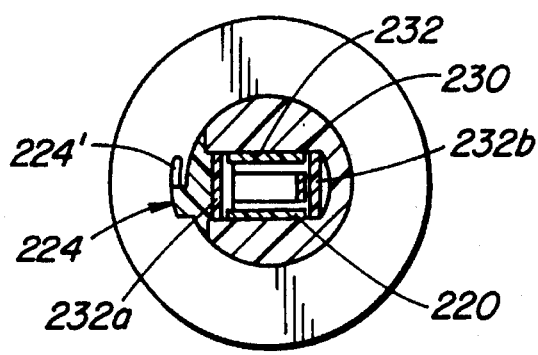
FIG. 16 is a cross-section on lines 16—16 of FIG. 13.
Figure 17:
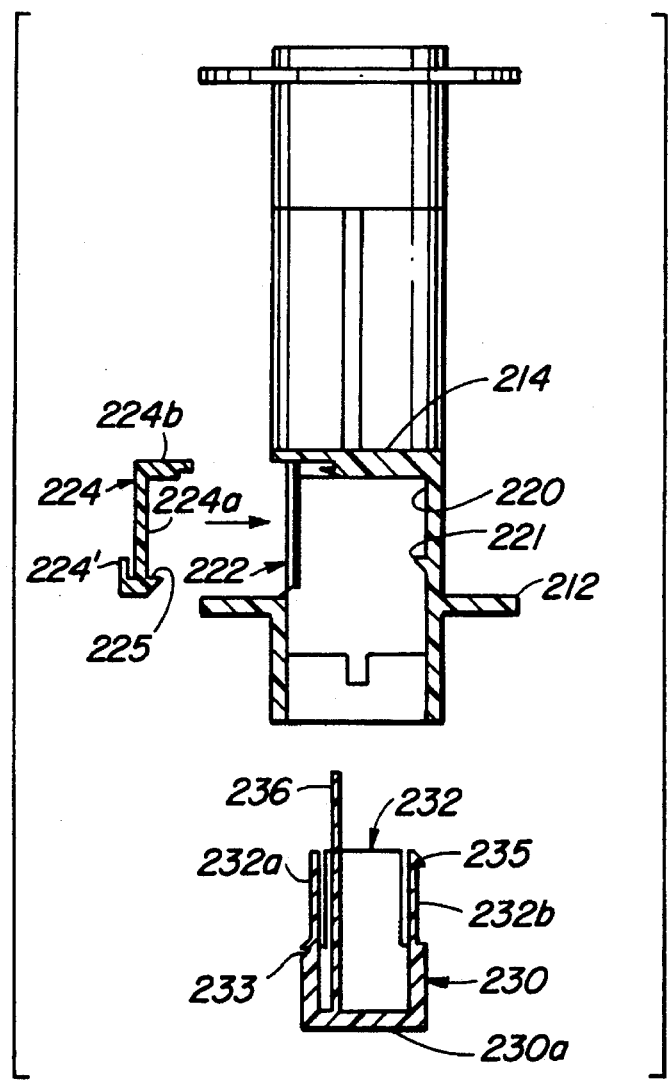
FIG. 17 is a sectional view similar to FIG. 13 but with the components of the third embodiment of spool shown separated.
Figure 18:
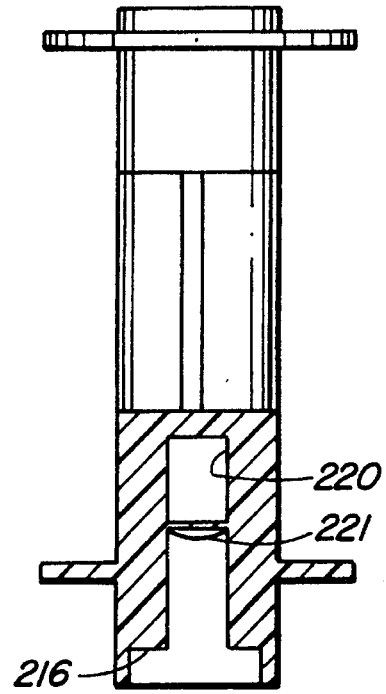
FIG. 18 is a view of the third embodiment of spool, similar to FIG. 14, but with the movable element removed.

The indicator itself is provided by the lower end wall 230a of an axially slidable element 230 which is shown in detail in FIGS. 14 to 17. The element is integrally molded of resilient plastic material, and has a mainly rectangular body formed by flat sidewalls 232 which extend inwardly from an end wall 233, these sidewalls effectively surrounding a cavity, but having their edges slightly spaced apart as seen in FIGS. 16 and 17. The side walls are dimensioned to be readily slidable in the rectangular recess 220. A narrow front sidewall 232a is provided with a first latching means or notch 233 which engages on the detent 225 when the element is in its first, inner, position, as shown in FIG. 13, and an opposite sidewall 232b is provided with a second latching means in the form of a hooked end piece 235 which is capable of engaging on the detent 221. Sidewall 232b is sufficiently flexible that when the element 230 is inserted into the core interior, this snaps over the detent 221.

The element 230 is integrally molded with a leaf spring in the form of a resilient strip of plastic 236. This strip, in its relaxed state seen in FIGS. 15 and 17, extends within the cavity of the element and beyond the sidewalls 232; however in an initial condition as seen in FIG. 13 it is compressed and bowed between the end wall 230a and the partition 214, in which position the element is held in place by engagement of the detent 225 on the notch 233. In this position the strip 236 can help to hold in place the leg 224b of the door part 224.

Figure 15:
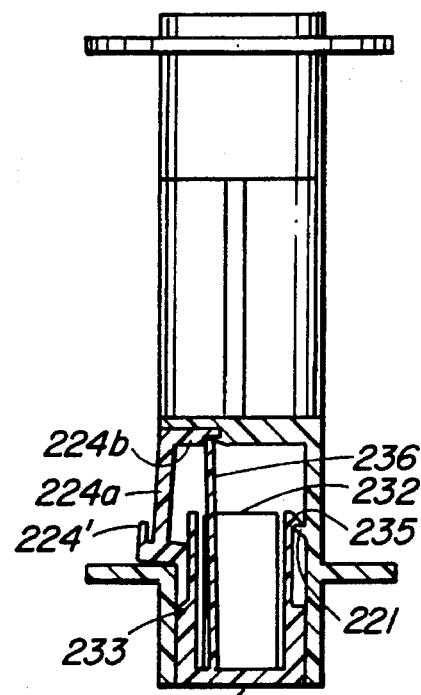
FIG. 15 is a view similar to FIG. 13 with the movable element in its second position.

It will be evident that in operation, tension on the filmstrip will pull the leg 224a slightly outwards from the core recess, and this will allow the spring 236 to push the element 230 from its first position, shown in FIG. 13, to the second position shown in FIG. 15, where further movement is prevented by engagement between hooked end piece 235 and detent 221. At this position the end wall 230a of the movable element 230 is readily visible as indicating that film has been fully exposed. It also prevents any possible engagement between ribs 216 and film winding means in cameras which have their winding means located at the lower end of the spool.

It will also be evident that this embodiment is inexpensive to make, requiring only three parts which are all easily molded.

We claim:

1. A film spool of the type which is rotatable inside a cassette shell and having means attachable to one end portion of a length of photographic film to be wound thereon, and having film exposure indicator means for providing visible indication that the film has been exposed;

wherein the spool has a core at least a portion of which has a hollow interior, and wherein the indicator means comprises an element having an indicating part and movable within said hollow interior from a first position to a second position, in which second position said indicator part gives a visual indication of exposure, and further comprises spring means urging the element towards the second position, and retaining means with an operable connection to an end portion of a film held by said attachable means to prevent movement of the element to the second position when any film remains wound on the spool;

said operable connection allowing said retaining means to move outwardly from the hollow interior of the core when the film is wholly unwound from the spool to release the element and to allow the element to be moved by the spring means to its second position.

2. A film spool according to claim 1, of the type having a first recessed end and a second projecting end, the first end being engageable by winding means, and the second end including said hollow interior, wherein said element is movable axially within the spool core interior, and wherein, in said second position, an end of said element which provides said indicating part is readily visible at the said projecting end of the core.

3. A film spool according to claim 2, wherein the said second projecting end has inwardly projecting parallel ribs, and wherein said element is slidable on said ribs and the indicator part thereof is aligned with or beyond the outer ends of said ribs when in said second position.

4. A film spool according to claim 1, of the type having a first recessed end and a second projecting end, the second end including said hollow interior in which said element is movable, said hollow interior having inwardly projecting ribs engageable by camera winding means, and wherein said element is slidable on said ribs, said element preventing engagement of the winding means when in said second position.

5. A film spool according to claim 1, wherein said core includes an aperture in its side communicating with said hollow interior, and wherein the retaining means comprises a door hinged to said core so as to cover said aperture when held against the core by the film strip and so as to move hingedly away from said core when the film is fully unwound, said door having a retaining lug or detent engaging said element when the door is held closed.

6. A film spool according to claim 5, wherein said door is provided as a portion of a molded plastic part which is fitted into said aperture, said part including a base portion which interlocks with said recess, said door and base portion being flexibly connected to allow hinging movement of the door to allow said retaining lug or detent to release the element.

7. A film spool according to claim 1, wherein said spring means is integrally molded with said element as a single piece.

8. A film spool according to claim 7, wherein said partially hollow interior of the core terminates in a partition, and wherein said integrally molded single piece providing said element and spring means has a hollow cavity terminating in an end wall and in part surrounded by side wall means, the outer surface of said end wall forming the indicator part of said element, and wherein said spring means comprises an elongated resilient member extending from said end wall within said cavity, said resilient member having a relaxed relatively straight condition extending from the end wall to beyond the ends of said side wall means, and having a compressed condition in which it is bowed between the end wall and said partition when said element is in its first position.

9. A film spool according to claim 1, in combination with a film strip attached to said attachable means and a cassette in which said spool is rotatable.

10. A film spool of the type which is rotatable inside a cassette shell and having means attachable to one end portion of a length of photographic film to be wound thereon, and having film exposure indicator means for providing visible indication that the film has been exposed;

wherein the spool is formed of three plastic molded parts, namely:

1) a spool body having a core at least a part of which has a hollow interior, and having in one side an aperture communicating with said interior;

2) an element movable within said interior from a first position to a second position, in which second position an indicator part of said element gives a visual indication of exposure, said movable element being integrally molded of resilient plastic material and having a hollow cavity terminating in an end wall and having side wall means at least partly surrounding said cavity, said end wall forming the indicator part of the element, and said element including an integrally molded spring member in the form of a resilient strip of plastic which, in its relaxed state, extends within said cavity from said end wall beyond said side wall means, and which, in its compressed condition, is bowed between the end wall and the partition, 3) retaining means comprising a door part which is fitted into said aperture, and which part has a main portion having means engageable with a film strip end portion and having internal retaining means, and has a base portion which interlocks with said aperture, and said main and base portions being flexibly connected together to allow hinging movement of the main portion;

and wherein said side wall means of said element has latching means engageable with said retaining means to prevent movement of said element to said second position when any film remains wound on the spool.

11. A film spool according to claim 10, further comprising second latching means on said side wall means engaging with a lug or detent in said core interior to prevent the element moving beyond said second position.

12. A film spool according to claim 10, wherein said hollow interior has internal ribs projecting inwardly at the adjacent end of the core, said ribs being engageable by camera winding means when the said element is in the first position, said element preventing engagement between the spool and the winding means when in said second position.

13. A film spool according to claim 10, in combination with a film strip attached to said attachable means and a cassette in which said spool is rotatable.

* * * * *